United States Patent [19]
Martin, Jr. et al.

[11] Patent Number: 5,764,725
[45] Date of Patent: Jun. 9, 1998

[54] APPARATUS FOR TESTING THE LINE CONTINUITY OF TELEPHONE SWITCH EQUIPMENT

[75] Inventors: Joseph S. Martin, Jr., Smyrna; Michael J. Garland, Woodstock, both of Ga.

[73] Assignee: Hitech Corporation, West Chester, Pa.

[21] Appl. No.: 622,073

[22] Filed: Mar. 26, 1996

[51] Int. Cl.$^6$ .............. H04M 1/04; H04M 3/08; H04M 3/22

[52] U.S. Cl. .............. 379/15; 379/21; 379/25; 379/26; 379/27; 379/30; 324/66; 324/539

[58] Field of Search .............. 379/15, 21–22, 379/25–27, 30, 33; 324/66, 539–543

[56] References Cited

U.S. PATENT DOCUMENTS

| | | | |
|---|---|---|---|
| 3,600,525 | 8/1971 | Garrett et al. | |
| 4,443,755 | 4/1984 | Wooten | 324/66 |
| 4,513,176 | 4/1985 | Fostveit | |
| 4,590,335 | 5/1986 | De Luca et al. | |
| 4,698,585 | 10/1987 | Herman et al. | 324/66 |
| 4,901,004 | 2/1990 | King | 324/66 |
| 4,922,516 | 5/1990 | Butler et al. | |
| 4,991,195 | 2/1991 | Hilligoss et al. | |
| 4,992,739 | 2/1991 | Kosch | |
| 5,193,108 | 3/1993 | Stocklin | |
| 5,220,285 | 6/1993 | Cerda | 324/66 |
| 5,414,343 | 5/1995 | Flaherty et al. | 324/66 |
| 5,436,555 | 7/1995 | Locke et al. | |
| 5,559,427 | 9/1996 | Hinds et al. | 324/66 |
| 5,677,633 | 10/1997 | Moser et al. | 324/539 |

OTHER PUBLICATIONS

Specialized Products Company, 1994 Catalog, pp. 65–66 and 68, 1994.
"Fujitsu Digital Loop Carrier (HA16B–6001–J100–01) Streaker Card", Fujitsu America, Inc. (Oct., 1991).
"Litespan 2000 Test Board", Telecom Assistance Group (1993).

*Primary Examiner*—Curtis A. Kuntz
*Assistant Examiner*—Duc Nguyen
*Attorney, Agent, or Firm*—Weiser and Associates P.C.

[57] ABSTRACT

An apparatus for testing the racks and installation wiring of telephone switch equipment takes the form of a module capable of insertion into the various slots of a particular rack configuration. The module includes a circuit board which terminates in a connector suitable for interconnection with a particular telephone switch system, and which receives a continuity testing subassembly useful in performing the desired testing. To this end, selected contacts (or pins) of the connector are coupled with a light emitting diode (LED) and a biasing circuit for operating the LED responsive to connection of the biasing circuit to ground. Each LED, and the biasing circuit, is provided with a suitable operating voltage which can either be derived from the rack which is being tested or a battery which is resident in the test apparatus. Also a corresponding method for testing the continuity of a particular wired connection, using the test apparatus, by touching the terminating end of the connection to ground using an appropriate probe or jumper which is electrically coupled with the frame of the rack. The test circuit is capable of being switched between different configurations which are appropriate for testing wired connections associated with different slots of the rack system, preferably automatically and responsive to the particular slot of the rack system which receives the test apparatus.

32 Claims, 3 Drawing Sheets

APPARATUS FOR TESTING THE LINE CONTINUITY OF TELEPHONE SWITCH EQUIPMENT

BACKGROUND OF THE INVENTION

The present invention generally relates to equipment for testing telephone systems, and more particularly, to equipment for testing the line continuity of telephone switch equipment.

A variety of systems exists for directing telephone signals between remote locations to establish a connection (voice and/or data) between such locations. These systems, generally referred to as "telephone switches", are primarily comprised of plural racks for receiving a series of modules (or circuit boards) bearing equipment for routing signals and establishing telephone connections, as desired. This can include telephone company equipment located at a central, so-called "company office" (CO), as well as corresponding equipment located at distributed local sites (e.g., for residential and/or commercial use). Telephone switch equipment located at the telephone company office is generally referred to as "central switch equipment", while the corresponding equipment located at the local site is generally referred to as "local switch equipment". The foregoing can be implemented with any of a variety of telephone switching systems such as the DDM-2000™ (dual digital multiplexer) system, and the D4™, SLC-96® and SLC Series 5® (digital loop carrier) systems which are presently most commonly employed by the various "Bell" operating companies, as well as other systems which may come to be employed for similar purposes.

An important aspect of such telephone switch systems, to which the present invention is directed, is verification of the various wired connections which are established within the plural racks of the system which are to eventually receive the telephone switch modules. Care must be taken to ensure that each of the many wired connections necessary for this are properly made (i.e., so-called "continuity testing"). This includes the need to verify that all wired connections have been made, that no short circuits are present, and that the wired connections (so-called "tip" and "ring" connections) are properly paired and exhibit the proper polarity. Presently, this requires that each of the many connections associated with the racks of the telephone switch be separately tested. However, this is a rigorous and time consuming procedure. This is equally so whether the telephone switch equipment being tested is originally manufactured, is tested as part of a repair, or is a refurbished or rebuilt unit which is being returned to service.

The labor intensive and time consuming nature of the continuity testing of telephone switch equipment is generally present irrespective of the type of system which is being tested, or the type of test equipment which is being used to perform such testing. For example, a basic means for continuity testing is to connect a circuit to and between the opposing ends of a wired connection to be tested, usually by hand and one wired connection at a time. Generally, this is done by connecting a conventional resistance (ohm) meter to and between the opposing ends of the wired connection, or by introducing a known signal (voltage, frequency, etc.) to one end of the wired connection, for appropriate detection at the opposing end of the wired connection. The former method of testing (ohm-meter) is known to be very cumbersome and time consuming due to its labor-intensive nature. The latter method of testing (signal detection) is also considered to be less than satisfactory in testing the continuity of rack wiring for telephone switch systems. Examples of such continuity testing systems would include those disclosed in U.S. Pat. Nos. 5,436,555 (Locke et al.); 5,193,108 (Stocklin); 4,992,739 (Kosch); 4,991,195 (Hilligoss et al.); 4,513,176 (Fostveit) and 3,600,525 (Garrett et al.).

As an example, U.S. Pat. No. 4,992,739 (Kosch) discloses an apparatus for testing wire bundles received by conduit to establish continuity between the opposing ends of such cabling. However, to operate this apparatus it is necessary to separately connect each of the wires associated with each of the opposing ends of the cable to each of two separate test fixtures. One of the fixtures operates to apply a signal to each of the plural wires associated with the cable extending through the conduit, while the remaining fixture operates to identify which of the plural wires (at the opposing end) receives the applied signal to determine the correlation between the two ends of the cable extending through the conduit. Such testing is not particularly applicable to the racks of telephone switch equipment because the primary purpose of testing such racks is not to determine the destination of a particular wire, but rather to determine whether a particular (known) wired connection has been effectively made.

Also to consider is that generally speaking, such devices are not particularly well suited to testing the rack wiring of telephone switch equipment because such devices are primarily intended for testing live (i.e., active) line pairs. The racks of telephone switch equipment under test are generally not active during the testing procedure, and it is generally desirable to separately test the various single line connections of the racks, before the racks are fitting with the modules and other equipment needed to place the telephone switch equipment in an active condition.

As a consequence, none of the foregoing systems are particularly well suited to testing the racks of, and the wired connections for, telephone switch equipment prior to placing such equipment in active service.

SUMMARY OF THE INVENTION

It is therefore the primary object of the present invention to provide a continuity test apparatus which is particularly well suited to testing the racks and installation wiring of telephone switch equipment.

It is also an object of the present invention to provide an apparatus for testing the racks and installation wiring of telephone switch equipment prior to placing such equipment in active service.

It is also an object of the present invention to provide an apparatus for testing the racks and installation wiring of telephone switch equipment during the manufacturing of, the subsequent servicing of, and the later refurbishing of telephone switch equipment.

It is also an object of the present invention to provide an apparatus for testing the racks and installation wiring of telephone switch equipment which is simple to use, and which can be directly inserted into the racks to automatically achieve the test functions which are desired.

It is also an object of the present invention to provide an apparatus for testing the racks and installation wiring of telephone switch equipment which is sufficiently versatile to test different slot positions associated with a particular rack configuration.

These and other objects which will become apparent are achieved in accordance with the present invention by providing an apparatus for testing the racks and installation wiring of telephone switch equipment which takes the form of a module capable of insertion into the various slots of a particular rack configuration. The module generally includes a circuit board which terminates in a connector suitable for interconnection with a particular telephone switch system (including the previously mentioned Bell systems, as well as other systems), and which receives a continuity testing subassembly useful in performing the desired testing. To this end, selected contacts (or pins) of the connector are coupled with a light emitting diode (LED) and a biasing circuit for operating the LED responsive to connection of the biasing circuit to ground. Each LED, and the biasing circuit, is provided with a suitable operating voltage which can either be derived from the rack which is being tested or a battery which is resident in the test apparatus.

In operation, all that is necessary to test the continuity of a particular wired connection is to touch the terminating end of the connection (which is known) to ground using an appropriate probe or jumper which is electrically coupled with the frame of the rack. The condition of the various LED's associated with the test apparatus then determines whether a proper connection has been established (correct LED illuminated), whether a connection has been established with a reversal in polarity (incorrect LED illuminated), whether a connection has been established with a short circuit (plural LED's illuminated) or whether no connection has been established (no LED illuminated). In this way, each of the several wired connections to be tested can be verified individually, and without the need to introduce additional signals onto the line. Consequently, such testing can be performed before the racks are fitted with active modules or other equipment, better suiting the resulting test procedure to the manufacture and/or refurbishing of racks prior to their assembly as complete systems or subsystems.

It is often desirable to use a single test apparatus to verify the wired connections associated with different slots of a particular rack system. This is further achieved in accordance with the present invention by configuring the test circuit to recognize the type of slot (of the rack) to be tested, and to switch the test circuit to and between the different configurations which are appropriate for testing the wired connections associated with that particular slot. This is preferably accomplished automatically, responsive to the particular slot of the rack system which receives the test apparatus.

For further detail regarding the test apparatus of the present invention, reference is made to the detailed description which is provided below, taken in conjunction with the following illustrations.

DETAILED DESCRIPTION OF PREFERRED EMBODIMENTS

Figure 1:
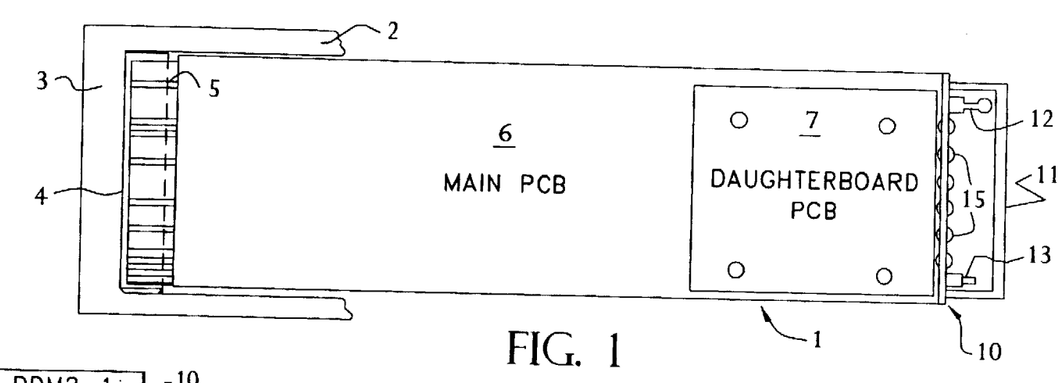
FIG. 1 is a schematic, side elevational view of a test apparatus received within a slot of a rack system.

FIG. 1 schematically illustrates a test apparatus 1 produced in accordance with the present invention. The test apparatus 1 is formed as a module for association with a slot 2 of a rack 3 of a conventional telephone switch. The telephone switch may either be a central switch, for placement at a telephone central office, or a local switch, for placement at a desired customer site (residential and/or commercial). The telephone switch may be implemented in any of a variety of known configurations including existing telephone switch equipment such as the DDM-2000™ (dual digital multiplexer) system and the D4™, SLC-96® and SLC Series 5® (digital loop carrier) systems which are presently most commonly used by the Bell operating companies, and others, as well as other telephone switch equipment which may come to be placed in service.

It will be understood that the configuration for the slot 2 and the rack 3 of the telephone switch, as well as the wired connections which are associated with the slot 2 and the rack 3, will vary responsive to the type of telephone switch equipment which is being tested. Primarily, these differences are accommodated by establishing a suitable interface between the test apparatus 1 and the slot 2 of the rack 3. This will include correct mating of the test apparatus 1 with the connector 4 associated with the slot 2 of the rack 3, and establishing appropriate electrical connections between the connector 4 and the circuitry associated with the test apparatus 1, as will be discussed more fully below.

To this end, the test apparatus 1 includes a connector which is configured to mate with the connector 4 associated with the slot 2 of the rack 3. As an example, and for the previously mentioned DDM-2000™ Dual Digital Multiplexer System, the connector 5 associated with the test apparatus 1 is implemented as a standard 39-pin (dual sided) PC-type male connector capable of mating with a corresponding 39-pin (dual sided) female connector 4 associated with the slot 2 of the rack 3 of the telephone switch. Since pin connections are only needed for testing desired electrical connections, some or all of the available pin connections may be used, as is appropriate for a particular testing operation.

Such PC-type connections are themselves known, and well suited to the manufacturing process. However, the connector 5 will necessarily vary responsive to the specific type of connector 4 which is associated with the slot 2 of the rack 3 of the telephone switch equipment to be tested. Consequently, the test apparatus 1 may, in appropriate cases, be fitted with discrete connectors, which are either separately wired or PC-wired responsive to the type of connector 4 associated with the slot 2 of the rack 3 of the telephone switch equipment to be tested.

The connector 5 is preferably associated with a main or "mother" board 6, which serves as a platform for the test apparatus 1. The mother board 6 includes the integral connector 5, or receives a discrete connector, as previously described. The mother board 6 is further preferably fitted with a subassembly or "daughter" board 7 for receiving the electrical circuit which will operate to provide the desired functions of the test apparatus 1, as will be discussed more fully below. The use of a separate, daughter board 7 to receive such circuitry is preferred for ease of assembly. However, it is equally possible for such circuitry to be directly associated with the mother board 6, if desired. The daughter board 7 is otherwise conventionally associated with the mother board 6, using assembly techniques which are themselves known. This would include the establishment of appropriate electrical connections between the circuitry mounted to the daughter board 7 and the pin connections associated with the connector 5. In the embodiment selected for illustration in the drawings, PC-type connections (traces)

would be used for such purposes, although wired connections could be used as an alternative in appropriate cases.

FIGS. 2A through 2D show the configurations for different front panels 10, 10', 10", 10'" associated with the test apparatus 1 of FIG. 1. In each case, the front panel is attached to the mother board 6 of the test apparatus 1, defining the general configuration of a rack module suited to being received within the slot of a rack system. To this end, the front panel is provided with a handle 11, for ease of use. Each front panel is further provided with a series of light emitting diodes (LED's), which serve as a display of the various testing functions which are to be performed by the test apparatus 1, and appropriate switches for establishing operations of the test apparatus 1 as will be discussed more fully below.

Figure 2A:
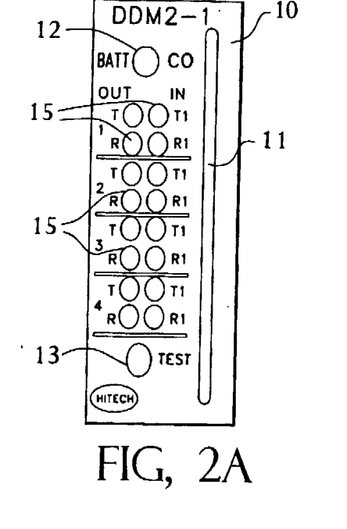
FIGS. 2A, 2B, 2C and 2D are front views of different configurations of the test apparatus, showing the front panel and display.

The configuration shown in FIG. 2A is suited to testing the previously described DDM-2000™ Dual Digital Multiplexer System, and includes a series of LED's corresponding to the various tip and ring connections for such a system. Consequently, an appropriate series of LED's 15 are provided for separately testing each of the four separate switch connections (telephone lines) associated with the racks of such an operating system. Corresponding switches are provided for allowing an operator to use the test apparatus 1 to achieve its desired testing functions.

To this end, the front panel 10 (FIGS. 1 and 2A) includes a pair of switches 12, 13. The switch 12 is a toggle-type switch capable of selecting between one of two modes of operation. In a first mode of operation (CO), voltages derived from an active rack system (resident power) are used to power the test apparatus 1. In a second mode of operation (BATT), an on-board supply (e.g., a 9V battery) is used to power the test apparatus 1. The switch 13 is a momentary contact switch for use in closing a circuit capable of testing the LED's 15 (by illuminating the LED's) to verify their operative condition.

Figure 3:
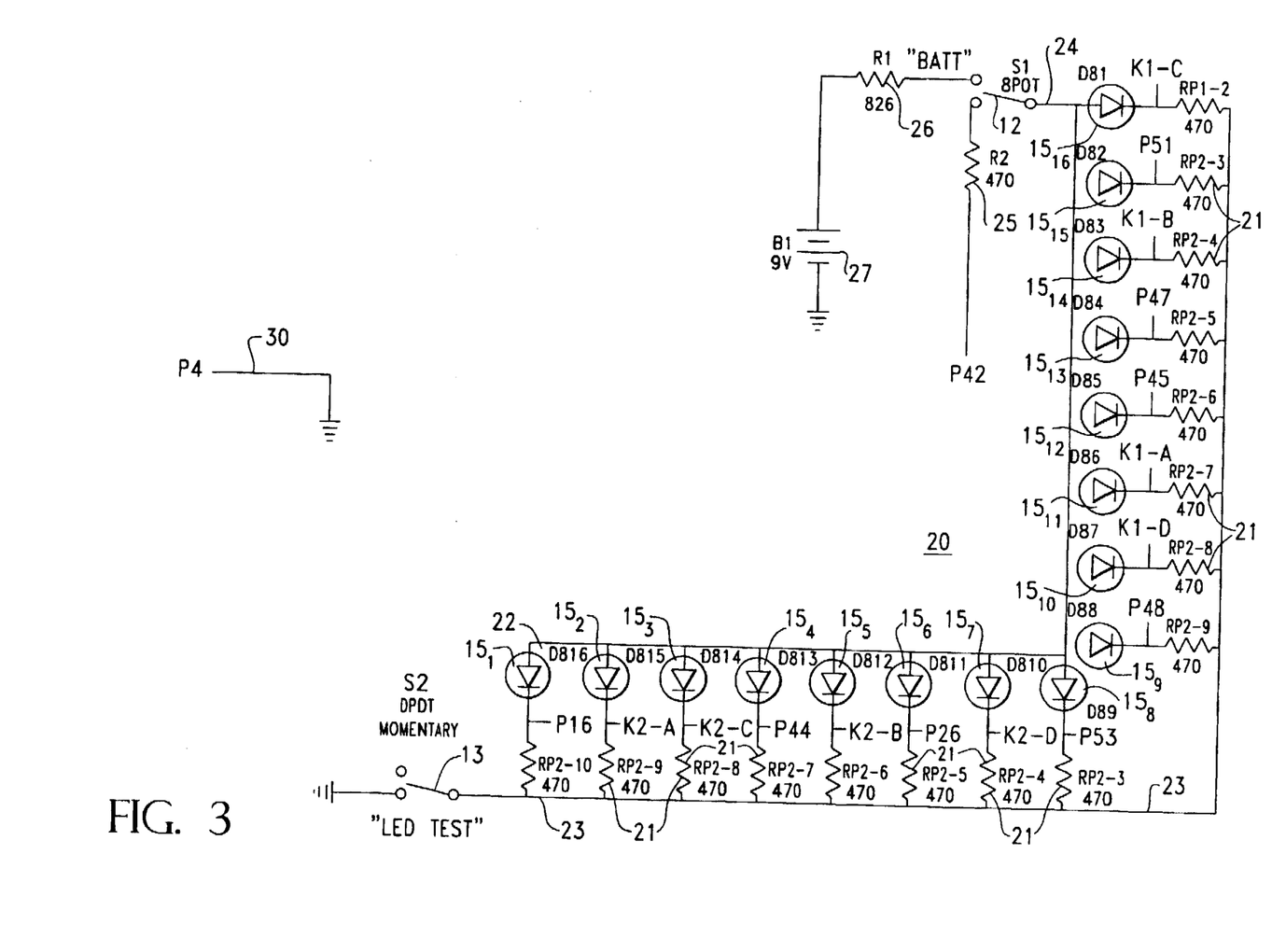
FIG. 3 is a schematic diagram of a test apparatus suitable for testing a particular slot of a specified rack system.

FIG. 3 illustrates an electric circuit 20 for implementing the test apparatus 1. In this illustrative embodiment, the circuit 20 is associated with the daughter board 7, as previously described. The circuit 20 may similarly be associated with the mother board 6, or some other conventional wiring technique may be used, as desired.

The circuit 20 includes a series of LED's $15_1$, $15_2$, ..., $15_{16}$, corresponding to the LED's 15 associated with the front panel 10 of the test apparatus 1. Each of the LED's 15 is series connected with a resistor 21, between a first buss 22 and a second buss 23.

The first buss 22 is connected to a voltage source, at 24. As previously indicated, the voltage source 24 may be derived either from resident voltage associated with the telephone switch equipment, or a battery associated with the test apparatus 1. The switch 12 is provided to select between these two functions. In selecting resident voltage (CO), the voltage source 24 is connected with a resistor 25 which, through an appropriate electrical connection with the connector 5 of the test apparatus 1, receives an appropriate biasing voltage from the connector 4 associated with the slot 2 of the rack 3. In selecting battery voltage (BATT), the voltage source 24 is connected with a series combination of a resistor 26 and a battery 27 (e.g., a 9V battery).

The second buss 23 is connected to the switch 13, and the normally open contact of the switch 13 is in turn connected to ground. As a consequence, by momentarily depressing the switch 13, a connection is momentarily established with ground. This, in turn, completes a circuit connecting the voltage source 24 (irrespective of how developed) and ground which includes each of the sixteen series combinations of LED's 15 and resistors 21 associated with the circuit 20. This causes illumination of the LED's 15 and serves as a test to ensure that each of the series of LED's 15 is operational. It will be understood that in its normal position, the switch 13 will be isolated from ground, isolating the second buss 23 from ground and essentially removing the resistors 21 and the second buss 23 from the circuit 20.

The cathodes of the LED's 15 are respectively connected to each of a series of pin connections associated with the connector 5 of the test apparatus 1. Each of these pin connections corresponds to, and communicates with a proximal (near) end of one of the wired electrical connections to be tested in accordance with the present invention. As a result, and for each of the LED's 15, a separate circuit is established between the voltage source 24 and the opposing (distal) end of each of the wired electrical connection to be tested, upon connecting the distal end of the wired electrical connection to ground. Consequently, all that is required to complete each of the resulting circuits (and test each of the corresponding wired electrical connections) is to touch the distal (terminating) end of the wired electrical connection with a suitable probe (shown at 30), which is in turn connected to ground.

In use, the test apparatus 1 of the present invention is inserted into the desired slot 2 of the rack 3 to be tested. In so doing, the connector 5 of the test apparatus 1 is mated with the connector 4 of the slot 2 of the rack 3, establishing the pin connections which determine the wired electrical connections to be tested. The switch 12 is used to select between resident voltage (CO) or on-board voltage (BATT), as desired. The switch 13 is preferably momentarily depressed to verify the operations of the test apparatus 1. The probe 30 is connected to ground, leaving the test end of the probe 30 available for use in performing desired testing. To this end, the test end of the probe 30 is serially placed in contact with the terminating (distal) ends of all wired connections to be tested in accordance with the present invention (by an operator).

The test apparatus 1 establishes the biasing needed to illuminate the LED'S 15 responsive to the condition of each of the wired electrical connections under test. For example, if the probe 30 is caused to contact the terminating end of a particular wired electrical connection, and none of the LED's associated with that electrical connection are illuminated, an open circuit is identified. If the probe 30 is caused to contact the terminating end of the wired electrical connection under test, and one of the LED's 15 is illuminated, the condition of the wired electrical connection is indicated by which of the available LED's is caused to illuminate. For example, if the wired electrical connection under test is a tip connection, and the LED 15 associated with the corresponding tip connection under test is caused to illuminate, a proper electrical connection is verified. Similarly, if the wired electrical connection under test is a tip connection, and the LED 15 associated with the corresponding ring connection is caused to illuminate, a reversed electrical connection is shown to be present. If the probe 30 is caused to contact the terminating end of a particular wired electrical connection, and plural LED's are illuminated, a short circuit is identified.

Similar testing procedures would be performed serially and one at a time, for each of the several tip and ring connections of each of the several telephone lines associated with a particular slot under test, until all of the plural connections are tested and verified. As an example, and for a DDM-2000™ Dual Digital Multiplexer System, the several wired electrical connections are tested in accordance with Table 1, as follows.

TABLE 1

| Item | Channel | Designation | Description |
|---|---|---|---|
| 1 | 1 to 4 | T | Tip - Turns on when ground is applied to the DS1 Output Tip. |
| 2 | 1 to 4 | R | Ring - Turns on when ground is applied to the DS1 Output Ring. |
| 3 | 1 to 4 | T1 | Tip - Turns on when ground is applied to the DS1 Input Tip. |
| 4 | 1 to 4 | R1 | Ring - Turns on when ground is applied to the DS1 Input Ring. |

In this way, each of the several wired electrical connections associated with a particular slot of the rack is individually tested to ensure proper continuity. This is accomplished with a separate and discrete test procedure for each of the several wired electrical connections involved. It is not necessary for paired connections to be tested, avoiding the need to isolate which of the two (paired) connections may be causing an improper result, in the event of such an occurrence.

Figure 2B:
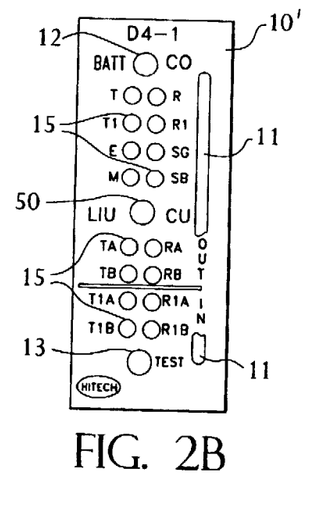

As previously indicated, the test apparatus 1 of the present invention is equally suited to testing other telephone switch systems. FIG. 2B shows a front panel 10' of an apparatus useful in testing a D4™ Digital Loop Carrier System. Table 2, which follows, summarizes the wired electrical connections which are tested with such an apparatus.

TABLE 2

| Item | Mode | Designation | Description |
|---|---|---|---|
| 1 | CU | T | Tip TX - Turns on when ground is applied to the transmit Tip. |
| 2 | CU | R | Ring TX - Turns on when ground is applied to the transmit Ring. |
| 3 | CU | T1 | Tip RX - Turns on when ground is applied to the receive Tip. |
| 4 | CU | R1 | Ring RX - Turns on when ground is applied to the receive Ring. |
| 5 | CU | E | E Lead - Turns on when ground is applied to the E lead. |
| 6 | CU | M | M Lead - Turns on when ground is applied to the M lead. |
| 7 | CU | SB | SB Lead - Turns on when ground is applied to the SB lead. |
| 8 | CU | SG | SG Lead - Turns on when ground is applied to the SG lead. |
| 9 | LIU | TA | Tip A - Turns on when ground is applied to the A digroup transmit Tip Lead. |
| 10 | LIU | RA | Ring A - Turns on when ground is applied to the A digroup transmit Ring Lead. |
| 11 | LIU | TB | Tip B - Turns on when ground is applied to the B digroup transmit Tip Lead. |
| 12 | LIU | RB | Ring B - Turns on when ground is applied to the B digroup transmit Ring Lead. |
| 13 | LIU | T1A | Tip A - Turns on when ground is applied to the A digroup receive Tip Lead. |
| 14 | LIU | R1A | Ring A - Turns on when ground is applied to the A digroup receive Ring Lead. |
| 15 | LIU | T1B | Tip B - Turns on when ground is applied to the B digroup receive Tip Lead. |

TABLE 2-continued

| Item | Mode | Designation | Description |
|---|---|---|---|
| 16 | LIU | R1B | Ring B - Turns on when ground is applied to the B digroup receive Ring Lead. |

Figure 2C:
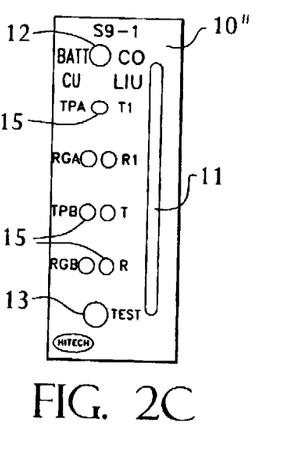

FIG. 2C similarly illustrates a front panel 10" of an apparatus useful in testing an SLC-96® Digital Loop Carrier System. Table 3, which follows, summarizes the wired electrical connections which are tested with such an apparatus.

TABLE 3

| Item | Mode | Designation | Description |
|---|---|---|---|
| 1 | CU | TPA | Tip A - Turns on when ground is applied to the A Channel Tip. |
| 2 | CU | RGA | Ring A - Turns on when ground is applied to the A Channel Ring. |
| 3 | CU | TPB | Tip B - Turns on when ground is applied to the B Channel Tip. |
| 4 | CU | RGB | Ring B - Turns on when ground is applied to the B Channel Ring. |
| 5 | LIU | T | Tip - Turns on when ground is applied to the span transmit Tip Lead. |
| 6 | LIU | R | Ring - Turns on when ground is applied to the span transmit Ring Lead. |
| 7 | LIU | T1 | Tip - Turns on when ground is applied to the span receive Tip Lead. |
| 8 | LIU | R1 | Ring - Turns on when ground is applied to the span receive Ring Lead. |

Figure 2D:
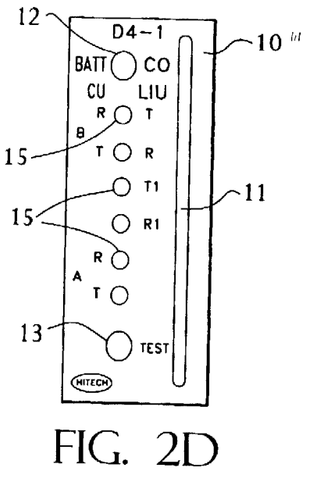

FIG. 2D similarly illustrates a front panel 10''' of an apparatus useful in testing an SLC Series 5® Digital Loop Carrier System. Table 4, which follows, summarizes the wired electrical connections which are tested with such an apparatus.

TABLE 4

| Item | Mode | Designation | Description |
|---|---|---|---|
| 1 | CU | A T | Tip A - Turns on when ground is applied to the A Channel Tip. |
| 2 | CU | A R | Ring A - Turns on when ground is applied to the A Channel Ring. |
| 3 | CU | B T | Tip B - Turns on when ground is applied to the B Channel Tip. |
| 4 | CU | B R | Ring B - Turns on when ground is applied to the B Channel Ring. |
| 5 | LIU | T | Tip - Turns on when ground is applied to the span transmit Tip Lead. |
| 6 | LIU | R | Ring - Turns on when ground is applied to the span transmit Ring Lead. |
| 7 | LIU | T1 | Tip - Turns on when ground is applied to the span receive Tip Lead. |
| 8 | LIU | R1 | Ring - Turns on when ground is applied to the span receive Ring Lead. |

Generally, and irrespective of the system under test, the foregoing testing will be accomplished with all other modules (other than the test apparatus) removed from the slots of the rack, except for the applicable power source module for the system under test in cases where resident power (CO)

has been selected (using the switch 12 as previously described). This is done to avoid interference between the tests which are being performed and the electrical circuitry associated with the active modules of the system. However, in appropriate circumstances, the test apparatus may be used together with slots which are filled with some or all of their active modules, to achieve other testing functions (potentially generated by, or performed in conjunction with the other modules located in the slots). In any event, the test apparatus of the present invention may be used to perform testing at various stages during the manufacture, repair and/or refurbishing of telephone switch equipment, to achieve any of a number of desired testing functions.

It will be understood that various changes in the details, materials and arrangement of parts which have been herein described and illustrated in order to explain the nature of this invention may be made by those skilled in the art within the principle and scope of the invention as expressed in the following claims. For example, and as previously indicated, the test apparatus of the present invention is useful in testing any of a variety of telephone switch systems, including those which are specifically described as well as other systems which are in use or which may be used to meet future servicing needs. The test apparatus of the present invention is also potentially useful in testing other rack and installation wiring systems, for applications other than telephone switch equipment. The circuits and configurations described may be varied to develop the operative combinations desired for a particular application. This may include other circuits for employing LED's, or circuits for employing other lighting elements (e.g., bulbs). The foregoing description should therefore be considered as illustrative and not limiting in scope.

Also to consider is that the test apparatus 1 previously described is primarily intended for use in testing a particular slot configuration for a particular rack system. The test apparatus 1 is generally not intended for use in testing different slot configurations (of a particular rack, or of different racks) unless the slots are substantially identical in their configuration (e.g., their connectors 4 and the pin connections which are to be established).

Figure 4:
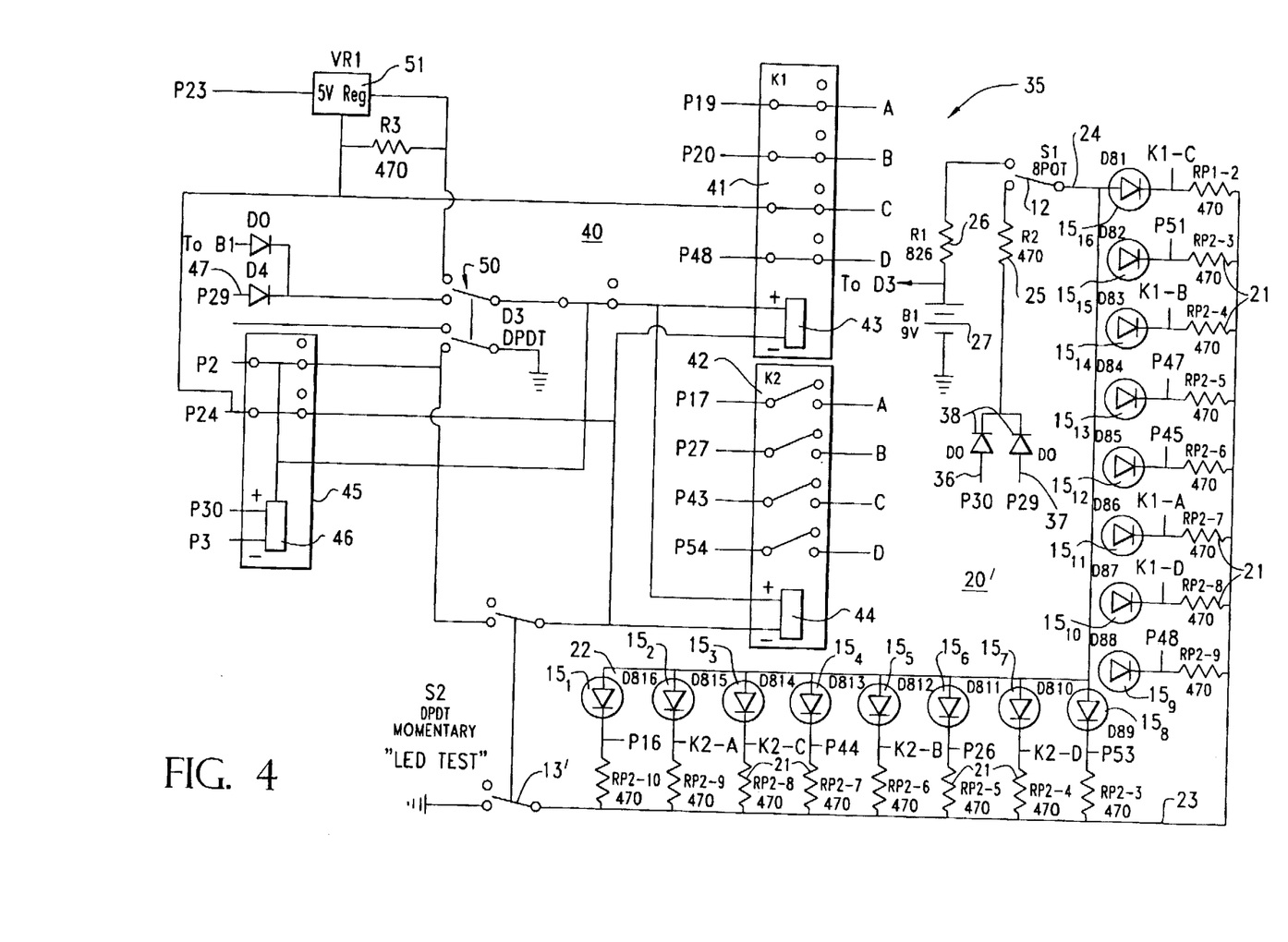
FIG. 4 is a schematic diagram of an alternative embodiment test apparatus which is capable of use in testing different types of slots in a specified rack system.

To enhance the versatility of the test apparatus of the present invention, FIG. 4 shows an alternative embodiment test apparatus 35 which provides the same test functions as the test apparatus 1 of FIG. 3, but which is additionally able to accommodate slots of different configurations (located within a single rack system, or of different rack systems).

Much of the test apparatus 35 corresponds in structure to the test apparatus 1. For the alternative embodiment test apparatus 35 selected for illustration in FIG. 4 (which is intended for use with a D4™ Digital Loop Carrier System), this would include an overall configuration which is similarly based upon a mother board 6 which terminates in an appropriate connector 5 and a front panel (in this case a panel 10') for the system under test, and which includes a daughter board 7 for receiving an appropriate electrical circuit 20'. The electrical circuit 20' again includes a series of LED's 15, with corresponding pin connections. A first buss 22 is similarly connected to a voltage source 24, and a second buss 23 is connected to ground by a momentary contact switch 13 (for purposes of testing the resulting circuit). The voltage source 24 is similarly selectable between resident voltage (CO) and on-board voltage (BATT) responsive to the switch 12.

However, unlike the test apparatus 1, the resident voltage (CO) for the test apparatus 35 is derivable from one of two sources, depending upon the slot of the rack with which the test apparatus 35 is associated. For example, a first input 36 derives a voltage from a pin connection associated with a first type of slot, while a second input 37 derives a voltage from a pin connection associated with a second (different) type of slot associated with the rack. The resulting voltage is applied to the resistor 25, developing the resident voltage (CO) which is desired. Rectifying diodes 38 are placed in series with the inputs 36, 37 to prevent voltages from incorrectly being shunted to the remaining input (36, 37), which is not then in use, to avoid coupling a voltage with other circuitry (for purposes of safety and/or proper operation).

The test apparatus 35 additionally includes a switch-over circuit 40 which operates to automatically identify the type of slot which is to receive the test apparatus 35, and to accordingly modify the pin connections for the test apparatus 35 to properly mate with the connector of the slot which is to receive the test apparatus 35. To this end (and again, for illustrated use with a D4™ Digital Loop Carrier System), the switch-over circuit 40 is primarily comprised of a pair of relays 41, 42. Each of the relays 41, 42 includes a series of connections A, B, C, D which are selectively coupled with the pin connections associated with some of the LED's 15 of the test apparatus 35. For example, a first grouping of LED's 15 (i.e., the LED's $15_2$, $15_3$, $15_5$, $15_7$, and the LED's $15_{10}$, $15_{11}$, $15_{14}$, $15_{16}$) are coupled with the relays 42, 41, respectively. These pin connections correspond to the desired pin connections for the different slots of the rack which are to be tested using the single (switchable) test apparatus 35. The remaining pin connections associated with the LED's 15 (i.e., the pin connections for LED's $15_1$, $15_4$, $15_6$, $15_8$, $15_9$, $15_{12}$, $15_{13}$ and $15_{15}$) maintain a direct coupling with the connector 5 of the test apparatus 35 since these pin connections are uniform for the different slots of the rack being tested, and do not conflict with one another, irrespective of the placement of the switchable test apparatus 35.

For those pin connections requiring a switch-over, the relays 41, 42 are operated responsive to the particular type of slot with which the test apparatus 35 is to be used. Toggling of the relays 41, 42, and accordingly, the pin connections A, B, C, D of the respective relays, is accomplished responsive to relay drivers 43, 44 associated with the relays 41, 42, respectively. To this end, each of the relay drivers 43, 44 is connected between a positive voltage and a negative voltage (or ground), for operation in their usual manner. The relay drivers 43, 44 are mutually (and exclusively) coupled so that when the relays 41, 42 are toggled, the pin connections A, B, C, D of one of the relays are coupled with desired pin connections, while the pin connections A, B, C, D of the other relay are decoupled from their scheduled pin connections. In this way, proper pin connections of the relays 41, 42 with the connector 5 of the test apparatus 35 are established responsive to the type of slot which then receives the test apparatus 35.

Toggling of the relays 41, 42 is accomplished responsive to applied voltages received at the connector 5 when the test apparatus 35 is inserted into a particular slot of the rack. For example, and as previously indicated, a first voltage input 36 is received from a first type of slot (and delivers resident voltage to the test apparatus 35 as previously described). The input 36 is coupled to a relay driver 46 of a control relay 45. Operation of the relay driver 46 causes the control relay 45 to toggle between the two states desired for controlling the relays 41, 42, to establish the particular pin connections which are desired for a particular test procedure. In this way, the test apparatus 35 is made automatically responsive to the particular type of slot which receives the test apparatus 35, achieving its desired function.

A second voltage input 37, received from a second type of slot as previously described (for delivering resident voltage to the test apparatus 35), is also applied to the switch-over circuit 40 (at 47). For the D4™ Digital Loop Carrier System, the second voltage input 37 (applied at 47) is applied to an additional switch 50 which is used to allow the test apparatus 35 to be manually switched between configurations which are suitable for testing either the line interface unit (LIU) or the channel unit (CU) slots of the associated rack. The switch 50 is located on the front panel 10' (see FIG. 2B) of the test apparatus 35, and conveniently allows the operator to select between the LIU and CU modes according to the particular slot of the rack which is to be tested (see Table 2). In such case, the voltage applied to the switch-over circuit 40 is either derived from the voltage input 37 or a voltage rectification circuit 51 (5 volt regulation), responsive to the position of the switch 50 (LIU/CU, respectively).

Testing of the wired electrical connections associated with a particular slot of the rack proceeds substantially as previously described for the test apparatus 1 of FIG. 3. The test apparatus 35 is inserted into the appropriate slot and the switches 12, 50 are set to select the desired test mode (BATT/CO and LIU/CU). The probe 30 is placed in contact with the terminating ends of the wired electrical connections to be tested and the LED's 15 displayed on the front panel 10' are used to ascertain the condition of the wired electrical connection under test. A switch 13' is again provided to allow the LED's 15 to be tested, as previously described, to ensure their correct operation prior to a testing procedure. In the configuration of FIG. 4, the switch 13' includes a second pole to permit such testing irrespective of the operative mode then assumed by the switch-over circuit 40 (i.e., irrespective of the slot under test).

What is claimed is:

1. An apparatus for testing rack and installation wiring for continuity of wired connections associated therewith, each of the wired connections having proximal and distal ends, wherein the rack and installation wiring includes a plurality of slots for receiving corresponding modules, wherein the plurality of slots include at least two different wiring configurations, and wherein the apparatus comprises:

a module having a connector for engaging a connector associated with the rack and installation wiring, for establishing interconnections with the proximal ends of the wired connections to be tested, wherein the connector of the module and the connector of the rack and installation wiring include corresponding pin connections;

an electrical circuit associated with the module and electrically coupled with the connector of the module, including a plurality of light emitting devices, each of which is adapted to be electrically connected between a voltage source and one of the pin connections associated with the connector of the module; and a probe adapted to be coupled to ground and including a terminating end for contacting the distal ends of the wired connections, for establishing an electrical circuit including the voltage source, the light emitting device, the wired connection, and the probe;

wherein illumination of the light emitting device verifies the continuity of the wired connection; and means for matching the apparatus with different series of wired connections to be tested, including means for switching the apparatus between a first configuration including pin connections corresponding to a first wiring configuration and a second configuration including different pin connections corresponding to a second wiring configuration, wherein pin connections of the first configuration conflict with pin connections of the second configuration and the matching means is a relay for selectively connecting the electrical circuit with the conflicting pin connections.

2. The apparatus of claim 1 which further includes a pair of relays for coupling the pin connections of the first configuration with the electrical circuit and for decoupling the pin connections of the second configuration from the electrical circuit to interconnect the electrical circuit with the first wiring configuration to be tested, and for decoupling the pin connections of the first configuration from the electrical circuit and for coupling the pin connections of the second configuration with the electrical circuit to interconnect the electrical circuit with the second wiring configuration to be tested.

3. The apparatus of claim 1 wherein the relay includes a relay driver for operating the relay responsive to a voltage derived from the connector associated with the rack and installation wiring.

4. The apparatus of claim 3 wherein the relay driver operates automatically, responsive to the derived voltage.

5. A method for testing rack and installation wiring for continuity of wired connections associated therewith, wherein each of the wired connections has proximal and distal ends, wherein the rack and installation wiring includes a plurality of slots for receiving corresponding modules, wherein the plurality of slots include at least two different wiring configurations, and wherein the method comprises the steps of:

establishing interconnections with the proximal ends of the wired connections to be tested by mating a module having a connector with a connector associated with the rack and installation wiring, wherein the connector of the module and the connector of the rack and installation wiring include corresponding pin connections, and wherein the module includes an electrical circuit including a plurality of light emitting devices, each of which is electrically connected between a voltage source and one of the pin connections associated with the connector of the module;

matching the electrical circuit to the two different wiring configurations by switching the electrical circuit between a first configuration including pin connections corresponding to a first wiring configuration and a second configuration including different pin connections corresponding to a second wiring configuration;

contacting the distal ends of the wired connections with a probe coupled to ground, establishing an electrical circuit including the voltage source, the light emitting device, the wired connection, and the probe; and verifying the continuity of the wired connection responsive to illumination of the light emitting device, wherein pin connections of the first configuration conflict with pin connections of the second configuration, and which further includes the steps of:

selectively connecting the electrical circuit with the conflicting pin connections;

coupling the pin connections of the first configuration with the electrical circuit and decoupling the pin connections of the second configuration from the electrical circuit, interconnecting the electrical circuit with the first wiring configuration to be tested, and decoupling the pin connections of the first configuration from the electrical circuit and coupling the pin connections of the second configuration with the electrical circuit, interconnecting the electrical circuit with the second wiring configuration to be tested; and automatically coupling and decoupling the pin connections responsive to a voltage derived from the connector associated with the rack and installation wiring.

6. An apparatus for testing rack and installation wiring for continuity of wired connections associated therewith, each of the wired connections having proximal and distal ends, and the apparatus comprising:

a module having a connector for engaging a connector associated with the rack and installation wiring, for establishing interconnections with the proximal ends of the wired connections to be tested, wherein the connector of the module and the connector of the rack and installation wiring include corresponding pin connections;

an electrical circuit associated with the module and electrically coupled with the connector of the module, including a plurality of output devices, each of which is adapted to be electrically connected between a voltage source and one of the pin connections associated with the connector of the module;

a probe adapted to be coupled to ground and including a terminating end for contacting the distal ends of the wired connections, for establishing an electrical circuit including the voltage source, the output device, the wired connection, and the probe, wherein operation of the output device indicates the continuity of the wired connection; and means for matching the apparatus with different series of wired connections to be tested, including means for automatically switching the apparatus between a first configuration including pin connections corresponding to a first wiring configuration and a second configuration including different pin connections corresponding to a second wiring configuration.

7. The apparatus of claim 6, wherein the voltage source is selectable between a battery associated with the module and a voltage derived from one of the pin connections associated with the connectors.

8. The apparatus of claim 6, wherein each output device is a light emitting device and illumination of the light emitting device indicates the continuity of the corresponding wired connection.

9. The apparatus of claim 6, wherein the rack and installation wiring is associated with telephone switch equipment.

10. The apparatus of claim 6, which includes a corresponding number of wired connections and output devices, and wherein each of the wired connections is separately tested according to the condition of the corresponding output device.

11. The apparatus of claim 10, wherein:

operation of the corresponding output device indicates continuity of the wired connection;

failure in operation of any output device indicates a lack of continuity of the wired connection;

operation of a non-corresponding output device indicates an incorrect wired connection; and operation of more than one output device indicates a short circuit in the wired connection.

12. The apparatus of claim 6, which further includes means for electrically testing the output devices, comprising a momentary contact switch adapted to be coupled to ground and in series combination with biasing resistors coupled with each of the plurality of output devices.

13. The apparatus of claim 6, wherein pin connections of the first configuration conflict with pin connections of the second configuration.

14. The apparatus of claim 13, wherein the matching means is a relay for selectively connecting the electrical circuit with the conflicting pin connections.

15. The apparatus of claim 14, which further includes a pair of relays for coupling the pin connections of the first configuration with the electrical circuit and for decoupling the pin connections of the second configuration from the electrical circuit to interconnect the electrical circuit with the first wiring configuration to be tested, and for decoupling the pin connections of the first configuration from the electrical circuit and for coupling the pin connections of the second configuration with the electrical circuit to interconnect the electrical circuit with the second wiring configuration to be tested.

16. The apparatus of claim 14, wherein the relay includes a relay driver for operating the relay responsive to a voltage derived from the connector associated with the rack and installation wiring.

17. The apparatus of claim 16, wherein the relay driver operates automatically, responsive to the derived voltage.

18. A method for testing rack and installation wiring for continuity of wired connections associated therewith, wherein each of the wired connections has proximal and distal ends, and wherein the method comprises the steps of:

establishing interconnections with the proximal ends of the wired connections to be tested by mating a module having a connector with a connector associated with the rack and installation wiring, wherein the connector of the module and the connector of the rack and installation wiring include corresponding pin connections, and wherein the module includes an electrical circuit including a plurality of output devices, each of which is electrically connected between a voltage source and one of the pin connections associated with the connector of the module;

matching the electrical circuit to one of at least two different wiring configurations by automatically switching the electrical circuit between a first configuration including pin connections corresponding to a first wiring configuration and a second configuration including different pin connections corresponding to a second wiring configuration;

contacting the distal ends of the wired connections with a probe coupled to ground, establishing an electrical circuit including the voltage source, the output device, the wired connection, and the probe; and verifying the continuity of the wired connection responsive to operation of the output device.

19. The method of claim 18, wherein pin connections of the first configuration conflict with pin connections of the second configuration, and which further includes the step of selectively connecting the electrical circuit with the conflicting pin connections.

20. The method of claim 19, which further includes the step of coupling the pin connections of the first configuration with the electrical circuit and decoupling the pin connections of the second configuration from the electrical circuit, interconnecting the electrical circuit with the first wiring configuration to be tested, and decoupling the pin connections of the first configuration from the electrical circuit and coupling the pin connections of the second configuration with the electrical circuit, interconnecting the electrical circuit with the second wiring configuration to be tested.

21. The method of claim 19 which further comprises the step of automatically coupling and decoupling the pin connections responsive to a voltage derived from the connector associated with the rack and installation wiring.

22. The method of claim 18, wherein the voltage source is selectable between a battery associated with the module and a voltage derived from one of the pin connections associated with the connectors.

23. The method of claim 18, wherein each output device is a light emitting device and illumination of the light emitting device indicates the continuity of the corresponding wired connection.

24. The method of claim 18, wherein the rack and installation wiring is associated with telephone switch equipment.

25. The method of claim 18, wherein the module includes a corresponding number of wired connections and output devices, and further comprising the step of separately testing each of the wired connections according to the condition of the corresponding output device.

26. The method of claim 25, wherein:

operation of the corresponding output device indicates continuity of the wired connection.;

failure in operation of any output device indicates a lack of continuity of the wired connection;

operation of a non-corresponding output device indicates an incorrect wired connection; and operation of more than one output device indicates a short circuit in the wired connection.

27. The method of claim 18, further comprising the step of electrically testing the output devices by coupling a momentary contact switch to ground and in series combination with biasing resistors coupled with each of the plurality of output devices.

28. The method of claim 18, wherein pin connections of the first configuration conflict with pin connections of the second configuration.

29. The method of claim 28, wherein the matching step is implemented by a relay that selectively connects the electrical circuit with the conflicting pin connections.

30. The method of claim 29, further comprising the steps of using a pair of relays to couple the pin connections of the first configuration with the electrical circuit and to decouple the pin connections of the second configuration from the electrical circuit to interconnect the electrical circuit with the first wiring configuration to be tested, and to decouple the pin connections of the first configuration from the electrical circuit and to couple the pin connections of the second configuration with the electrical circuit to interconnect the electrical circuit with the second wiring configuration to be tested.

31. The method of claim 29, wherein the relay includes a relay driver for operating the relay responsive to a voltage derived from the connector associated with the rack and installation wiring.

32. The method of claim 31, wherein the relay driver operates automatically, responsive to the derived voltage.

* * * * *